United States Patent [19]

Seiss et al.

[11] Patent Number: 5,204,176
[45] Date of Patent: Apr. 20, 1993

[54] STRUCTURAL SIDING COMPOSITION

[75] Inventors: Randolph H. Seiss; Robert J. Cleereman, both of Midland, Mich.

[73] Assignee: The Dow Chemical Company, Midland, Mich.

[21] Appl. No.: 845,104

[22] Filed: Mar. 3, 1992

[51] Int. Cl.⁵ .................... B32B 3/26; B32B 27/08
[52] U.S. Cl. ..................... 428/304.4; 428/317.1; 428/318.4; 428/319.3; 428/424.8; 428/425.1; 156/60; 156/326
[58] Field of Search ............ 428/304.4, 317.1, 318.4, 428/319.3, 424.8, 425.1; 156/60, 326

[56] References Cited

U.S. PATENT DOCUMENTS

| | | | |
|---|---|---|---|
| 2,339,913 | 1/1944 | Hanford et al. | 8/192 |
| 2,430,479 | 11/1947 | Pratt et al. | 156/331.4 |
| 2,597,025 | 5/1952 | Orth | 528/52 |
| 3,007,763 | 11/1961 | Adams | 8/192 |
| 3,666,593 | 5/1972 | Lee | 156/285 |
| 4,032,483 | 6/1977 | Hartman | 106/122 |
| 4,525,321 | 6/1985 | Tönniges | 264/517 |

FOREIGN PATENT DOCUMENTS

| | | |
|---|---|---|
| 61-225342 | 10/1986 | Japan . |
| 1148016 | 4/1969 | United Kingdom . |
| 1502979 | 3/1978 | United Kingdom . |
| 2075038 | 11/1981 | United Kingdom . |
| 2112791 | 7/1983 | United Kingdom . |

OTHER PUBLICATIONS

Archer, S and D Noack in "Zum Einfluss des Randabschulusses bei Sandwichelementen unter Feuchtigkeits und Temperaturbeanspruchung." Bauingenieur (1987) vol. 62, No. 6, pp. 263-272 as 1987(9):1000597 ICONDA.

Application Instructions for "ABITIBI Thermolock Siding Primed" 6 pages, no date.

Oertel, G. in "Innovative Polyurethanes are Changing Production Techniques," Utech 88 Conference Proceedings The Hague, 11th-13th Oct. 1988, pp. 30-31, filed as abstract.

Karcher, G. in "The Way to Greater Energy Saving Rely on Polyurethane Foaminsulating Materials Utech" 88 Conference Proceedings The Hague, 11th-13th Oct. 1988 pp. 114-118, filed as abstract.

"Foaming At The Core," in Adv. Composites Engng. 5, Nov. 1990, p. 16/9, filed as abstract.

Ysseldyke, D in "Design and Analysis of Low-Density Foam-Filled Blow Moulded Panels," Anter [89 Conference Proceedings New York, 1st-4th May 1989, pp. 966-971, filed as abstract.

Karst, H. F. in "Behaviour in Fire of Steel/Polyurethane Sandwich Panels," Polyurethanes World Congress 1989: 50 years of Polyurethanes. Conference Proceedings Aachen, 19th Sep.-2nd Oct. 1987, pp. 472-477, filed as abstract.

"Composite Panel Production Starts in Switzerland," ICI Polyure.Newslett 4, No. 6, 1990, p. 2, filed as asbstract.

"Land Transport Composites at Permali," Reinf Plast. 34, No. 4, Apr. 1990, pp. 28-31, filed as abstract.

(List continued on next page.)

Primary Examiner—William J. Van Balen

[57] ABSTRACT

A structural siding composition for use in the building industry comprising (a) siding layer prepared from an impregnated cellulosic material with an amount of essentially uncatalyzed polyisocyanate from about 8 to 20 percent by weight of polyisocyanate to cellulosic material, which has been heated at a temperature from about 105° to about 245° C. (221° to 473° F.) for a time not exceeding about 5 minutes and at a pressure from about 2700 to about 8300 kPa (390 to 1200 psi) sufficiently to cure the polyisocyanate, and (b) an insulating layer. In one embodiment, the composition further comprises an inner sheathing layer. A method of preparing the composition is also described. The composition provides a relatively high strength pre-fabricated exterior siding panel that can be attached to a frame building construction, contributing structural integrity and saving time and risks associated with traditional building methods requiring more steps. The siding layer can be formed or molded to simulate the appearance of conventional siding construction with reduced maintenance needs.

22 Claims, No Drawings

OTHER PUBLICATIONS

"Refrigerated Structures For Temporarily Storing Biomedical Wastes From Bally Engineered Structured Inc.," Plast Bldg Constr. 13, No. 12, 1989, p. 5, filed as abstract.

"New Weyerhauser Panels Use Plastics." Plast. Bldg. Constr. 13, No. 9, 1989, p. 6, filed as abstract.

"Construction Laminator Offers Effective Spray Alternatives," ICI Polyure. Newslett. 4, No. 2, 1988, p. 4, filed as abstract.

"Shaken But Not Stirred," ICI Polyure.Newslett. 4, No. 2, 1988, p. 3, filed as abstract.

"Chinese Construction Laminator Set To Build Own Market," ICI Polyure.Newslett. 4, No. 2, 1988, p. 5, filed as abstract.

"Fibreglass/PU Foam Industrial Building Panels," Plast. Bldg. Constr. 13, No. 3, 1988, pp. 4–5 filed as abstract.

"New Range of High Performance Doors in UK," Plast Rubb Wkly No. 1288 3rd Jun. 1989, p. 11 filed as abstract.

"Energy-Effecient Clean Rooms include PU Foam insulation Available From Bally Engineered Structures Inc.," Plast Bldg. Constr. 11, No. 6, 1988, p. 3 filed as abstract.

Cohen, A. and L. D. Booth in "Thermal Warp of Foam-Filled Composite Panels," Polyurethanes Exploring New Horizons. Proceedings of the 30th Annual Technical/Marketing Conf. held Toronto, Oct. 1986 New York, N.Y., pp. 298-303 filed as abstract.

Flury, M. in "Plastics in the BMW Roadster Z1," Kunst. Plast. 34, No. 12, Dec. 1987, pp. 18–19 filed as abstract.

Strobech, C. in "Polyurethane Adhesives for Sandwich Elements," ASE '86 Day three:non–destructive testing::environmental effects:applications London, Nov. 4–6, 1986, pp. 139-153 filed as abstract.

Burkhardt, S. in "Rigid Polyurethane Foam," Gummi Fas. Kunst. 41, No. 4, Apr. 1988, pp. 165-169 filed as abstract.

Riley, C. and E. Roach in "Monocoque Building System Suitable for Housing, Commercial and Other Building," Plast. Bldg. Constr 11, No. 1, 1987, pp. 8–12 filed as abstract.

"Panel Manufacturer Pioneers Low–Cost–Housing in Caribbean," ICI Polyure.Newslett, 3, No. 6, 1987 p. 2 filed as abstract.

"Foam-Filled Profiles Offer New Outlook," ICi Polyure.Newslett. 3, No. 4, 1987, p. 1 filed as abstract.

"FRP Panels Make Gains in Construction Uses," Canad.Plast. 45, No. 2, Mar. 1987, p. 9 filed as abstract.

"Refrigerated Lorry maker Builds on Rigid Foam Sandwich Panels," ICI Polyure.Newslett. 3, 1986, p. 4 filed as abstract.

"Forecast is Cold But Bright For Sandwich Panel Manufacturer," ICI Polyure.Newslett. 3, No. 2, 1986, p. 10 filed as abstract.

"Panel Maker Builds up Success," ICI Polyure.Newslett. 3, No. 2, 1986, p. 7 filed as abstract.

"Increasing Composite Panel Production," ICI Polyure.Newslett. 3, No. 1, 1986, p. 8 filed as abstract.

"New Laminating Process Delivers 'Superior' Polyurethane Building Panels," Mod Plast.Int 15, No. 6, Jun. 1985, p. 32 filed as abstract.

Dumolard, J. C. in "Composites in Competitive Marine Craft Lightweight But Strong Construction," Composites Plast.Renf.Fibres Verre Text 24, No. 4, Jul./Aug. 1984, pp. 4–9 filed as abstract.

"Tough Tests Show Glass Fibre-Reinforced Foam Panel Resists Fire Longer," ICI Polyure Newslett. 2, No. 12, Winter 1983/4, p. 7 filed as abstract.

"Rigid Foam Solves the Problem of Tunnel Insulation," ICI Polyure Newslett. 2, No. 12, Winter 1983/4, p. 6 filed as abstract.

"Steel Profiled Cold Store Panels Benefit From Rigid Foam Core," ICI Polyure Newslett 2, No. 12, Winter 1983/4, p. 8 filed as abstract.

Ferwerda, S. in "Innovation or Tradition?", Composites Plast.Reinf.Fibres Verre Text 24, No. 2, Mar./Apr. 1984, pp. 23-31 filed as abstract.

"Facing For Foam Insulation Panels," Plast. Bldg. Constr. 4, No. 10, Jul. 1980, pp. 6–7 filed as abstract.

Verheijen, A. P. J. M. in "Woningen Stevenshof in Leiden," Bouwen met stall (1989) vol. 22, No. 89, pp. 5-8 filed as abstract.

Burkhardt, S. in "Zeitabhaengige Verformungen von Sandwichelementen," Bauingenieur (1989), vol. 64, No. 7, filed as abstract.

Davies, J. M. in "Axially Loaded Sandwich Panels," Journal of Structural Engineering (1987) vol. 113, No. 11, pp. 2212-2230 filed as abstract.

"Wandelmente mit Cotto-Verkleidung Neubau NCR-Gebaeude Berlin mit Sandwich-Elementen fuer Aussenwaende" Fliesen und Platten (1988) vol. 38, No. 2, pp. 64–66 filed as abstract.

STRUCTURAL SIDING COMPOSITION

FIELD OF THE INVENTION

The present invention relates to the field of building construction products. More particularly, the present invention relates to a structural siding composition useful in the building industry for constructing side walls for dwellings and certain commercial buildings.

BACKGROUND OF THE INVENTION

The building industry currently employs a time-consuming and inefficient method of constructing exterior walls for residential and certain commercial buildings. Usually side walls are constructed by building a frame using lumber, nominally 2"×4" in dimension, and then attaching one or more let-in braces across the upright frame components ("studs"), which have been spaced usually at between 16 or 24 inch intervals, to improve racking strength and therefore dimensional stability, particularly at corners. Alternatively, a sheet of plywood, oriented strandboard, or other material is attached to the 2"×4" frame studs at the corners to provide the necessary racking strength. Insulation, e.g., glass fiber batts or foamed polymeric panels, may be applied between the 2"×4" frame components and then a vapor barrier consisting of a sheet of polyethylene or the like may be applied surrounding the exposed insulation surfaces. Next a "sheathing", such as a foamed polymeric material, cellulosic board, or oriented strandboard, is applied exterior to the outer vapor barrier (which is commonly called the "weather barrier") and then siding of some type (e.g., wooden clapboard, lapboard, or shingles, or profiled vinyl or aluminum siding, etc.) is applied on the outermost surface. Sheetrock may then be applied on the inner surface of the construction to finish the interior walls. Thus, a typically constructed wall for a wood frame (so-called "stick-built") dwelling or commercial building has about 6 layers (from inside to outside): sheetrock, vapor barrier, 2"×4" frame components including let-in braces or plywood sheets added for racking strength interspersed with insulation, weather barrier, sheathing, and external siding.

Thus, there are an average of eight or more steps needed to construct a wall including both interior and exterior portions. This multitude of steps is costly and requires significant challenges to the builder to keep inventory on hand, to protect the inventory from theft, and to protect partially completed side walls from vandalism and degradation by weather. It is therefore be desirable in the art to enable builders to construct walls more efficiently and with fewer costly risks.

One means of approaching this problem has been the development of "sandwich panels". These panels are frequently of the type used in constructing "pre-fabricated" homes, and typically include an insulative core, such as a rigid polyurethane or polystyrene foam, between cover sheets made of, e.g., thin metal, wood, steel, polyester, ABS and the like. Thus, these panels generally relocate one or more construction steps from the building site to the manufacturer's site, such that a portion of the wall is "pre-fabricated" before reaching the builder. Depending upon the application, the sandwich panel may be suitably load-bearing or not. In some cases the panels can be applied to a wooden frame, and in some cases panels may be interlocked to provide structural form and integrity.

SUMMARY OF THE INVENTION

Accordingly, the present invention provides a structural siding composition for use in building construction comprising (a) a siding layer prepared from an impregnated cellulosic material with an amount of essentially uncatalyzed polyisocyanate in an amount of from about 8 to 20 percent by weight of polyisocyanate to cellulosic material, which has been heated at a temperature from about 105°–245° C. (221°–473° F.) for less than about 5 minutes and at a pressure from about 2700 to 8300 kPa (390 to 1200 psi) sufficiently to cure the polyisocyanate, and (b) an insulating layer. In one embodiment, the composition further comprises an inner sheathing layer proximate to the insulating layer and distal to the siding layer. The siding layer can be profiled.

This structural siding composition provides a means of saving time and steps in constructing building side walls, potentially eliminating certain steps typically used in preparing "stick-built", i.e., frame dwellings and commercial buildings.

DESCRIPTION OF THE PREFERRED EMBODIMENTS

The composition of the present invention comprises at least two layers which have been combined to form a siding product. These two layers are, in general, a siding layer made of profiled hardboard and, attached thereto, an insulative layer. As used in construction, the profiled siding layer is used to form the outermost surface of the building, with the insulating layer, proximate to the siding layer, being positioned toward the building interior. In some embodiments a sheathing layer is also used. The sheathing layer is positioned adjacent to the insulating layer.

The outer siding layer is prepared of a particular material which is "profiled", i.e., configured, structured or embossed to a desired appearance (e.g., lapboard, shingle, shake, etc.), such that it can simulate the appearance of various wood, vinyl, or aluminum exterior siding products on the market today. This outer siding layer provides weather protection, impact resistance and wind penetration resistance, while use of the inner sheathing layer, in some embodiments, provides additional racking strength to the construction. Such strength is preferably at least sufficient to substitute for the let-in braces, plywood or oriented strandboard corner sheeting commonly used to provide racking strength in frame buildings, thus enabling the builder to eliminate time and steps in construction.

The profiled siding layer is configured of a modified cellulose product, which is described in U.S. Pat. No. 5,008,359 to Hunter, incorporated herein by reference in its entirety. In general, it is prepared by impregnating the cellulosic material with an essentially uncatalyzed polyisocyanate and then curing the impregnated material at predetermined temperatures and pressures, to a temperature from about 105° to about 245° C. Preferred temperatures are about 150° C. or greater with pressures of about 3,000 kPa or greater and times in the range of about 1–2 minutes. While it is preferred that no catalyst should be used, very small quantities are not generally detrimental. By "essentially uncatalyzed" is meant no more than 0.05 percent of any of the various catalysts normally used to promote reaction of an isocyanate to form a urethane compound. Surprisingly, it has been found that active catalysts tend to cause reduced adhesion between laminates made using impregnated sheets of the product, which may result in less desirable physical properties of the laminates. It has also been discovered that required pressing times of resins without catalysts are as short as or even very significantly shorter than with equivalent catalyzed resins.

Almost any cellulose based material is a suitable starting raw material for this invention. Examples are cellulosic fiber material such as bleached or unbleached kraft paper or linerboard, or other paper products, chemical or thermomechanical pulp sheets or mats and the like. Any cellulosic material that is sufficiently porous to take up a significant quantity of polyisocyanate may be utilized. The cellulosic fiber is preferably of a type and form which can be wet-formed into a cohesive sheet or mat. However, while moisture content of the cellulose is not highly critical, it is preferred that water represent less than about 7 percent by weight since the water will react with the polyisocyanate, thus reducing the molecular interactions between the polyisocyanate and the cellulosic material.

The isocyanate form used in the practice of the present invention is a polyisocyanate, which is defined herein as an isocyanate compound having at least two isocyanate groups. Preferably diphenylmethane diisocyanate and its oligomers are utilized, but other similar and related compounds can also be used effectively. These include, for example, all of the available di- and polyisocyanate materials such as toluene diisocyanate and 1,6-hexamethylene diisocyanate. The polyisocyanates can also be used in blocked form, i.e., having attached thereto at least one heat-labile substituent group that inhibits reaction below some specified temperature. Preferably the polyisocyanate is added in an amount such that the weight of the impregnated cellulosic material is from about 5 to about 50 percent greater than the weight of the unimpregnated cellulosic material. The amount of polyisocyanate relative to the amount of cellulosic material affects the physical properties of the final product. In general, the greater the amount of isocyanate, the greater the stiffness of the product. In manufacturing useful products that are relatively rigid, strong and water repellent, the polyisocyanate is preferably from about 8 to 20 percent which provides relatively high strength and, in many cases, a reasonable manufacturing cost.

Impregnating the cellulosic material can be done using either neat polyisocyanate or polyisocyanate which has been dissolved in a solvent. In neat form this can be accomplished by simply passing the cellulosic material through a roll coater which applies the polyisocyanate, to achieve the desired polyisocyanate pickup. Alternatively, the polyisocyanate can be dissolved in, for example, acetone or another organic solvent in a bath and the cellulosic material can be passed through the bath, allowing the material to become impregnated with the solution. Thereafter the solvent is preferably evaporated or dried, leaving the polyisocyanate in the cellulosic material. Preferably no catalyst is present during the impregnation step. However, small quantities of catalyst, preferably less than about 0.05% by weight of the polyisocyanate, are generally permissible without producing adverse effects.

After impregnation, the cellulosic material/polyisocyanate material is subjected to heat and pressure for a specific time in order to "cure" the composition. The curing step is preferably carried out in a hot press, such as are known to those skilled in the art, at a temperature from about 105° to about 245° C. for a time preferably not exceeding about 5 minutes and at a pressure of at least about 900 kPa. More preferably the pressure is from about 2700 to about 8300 kPa (392–1204 psi). If desired, the impregnated material can optionally be stored for a suitable period of time prior to the curing step. Storage times of at least several days at room temperature are generally permissible with significant deleterious effect. Those skilled in the art will know to balance the curing time with the temperature in order to optimize strength while minimizing degradation of the cellulosic material/polyisocyanate material.

While a single impregnated sheet of cellulosic material can be hot pressed to cure the polyisocyanate, in another embodiment of the present invention multiple sheets of the impregnated material can be laminated to each other. Such lamination may increase strength properties. In producing laminates, solvent impregnation by means of roller coating may be preferred. This is because higher surface concentrations have been found to promote strong interply bonding. However, those skilled in the art should preferably balance this knowledge with the realization that more uniform distribution of the polyisocyanate tends to produce greater isotropy in "Z" direction strength.

The results of the processes described hereinabove are relatively rigid hydrophobic sheets, of either one or multiple plies, that are preferably "profiled" during the pressing process on at least the surface that will be visible upon finished construction to produce desirable surface appearance. Such siding layer can be configured to represent, for example, conventional wooden, vinyl or aluminum clapboard, lapboard, shingle, shake or board and batten siding, with features arrayed horizontally or vertically. Other surface configurations are also within the purview of the present invention.

While flat sheets are preferably made continuously by utilizing heated rolls to develop the necessary temperature and pressure to polymerize the polyisocyanate, profiled sheets may be made either batch-wise in a heated press or continuously by having indexed molds where a "green sheet", i.e., an unimpregnated celluloric starting material is continuously fed into the profile molds on a moving conveyor. The molds pass through a high pressure zone, with sufficient dwell time to polymerize the polyisocyanate. Molds for either batch or continuous processes can be positioned at an angle to create uniform pressure to all faces of the siding being formed, or a cam action can be employed to create desired pressure for the faces perpendicular to the face of the siding.

Pigments, colorants, biocides, and other additives which are suitable for incorporation into the profiled siding layer and desired to further enhance appearance or performance of the ultimate product can also be added. A particular advantage of using colorants is that such color will be present throughout the siding and, thus, weathering will be less likely to necessitate time-consuming or expensive maintenance of the building exterior. Optionally, the outer siding layer can be painted, stained or otherwise surfaced at the factory, such as by application of a weatherable topsheet laid into the mold during the pressing or profiling process, thus eliminating the need to do so after installation at the building site.

This profiled outer siding layer is then combined with an insulating layer and, in a preferred embodiment, an inner sheathing layer of the desired constitution to form a type of panel for use as the structural siding composition of the present invention. The insulating layer can be prepared from a variety of materials known to those skilled in the art such as rigid insulation materials, for example, foamed polymeric materials such as foamed polystyrene, and/or foamed polyurethane materials, e.g., TRYMER* brand foam (*TRYMER is a trade designation of The Dow Chemical Company). Other insulating materials useful as the insulating layer of the present invention are known to those skilled in the art and are intended to fall within the purview of the present invention.

A third layer is optionally further applied as part of the structural siding composition of the present invention. This third layer is desirably an inner sheathing layer which is preferably positioned proximate to the insulating layer and distal to the siding layer. It is intended both to protect the insulating layer from mechanical damage, moisture or other deleterious conditions that may be encountered during storage, shipment and/or construction, and to provide a surface ready for application to the frame of the dwelling or commercial building. Thus, a so-called "sandwich panel" can be prepared. The inner sheathing layer can be of any suitable material, and can, if desired, be selected of a material to also provide additional structural strength, including racking strength, to the panel composition. Effective materials for the inner sheathing layer include steel, wood, aluminum, fiber-reinforced polymers, and the same impregnated cellulosic material used to prepare the profiled siding layer.

Attachment of the two or three layers of the present invention, one to another, can be by any effective means, and is preferably effected in a way to provide the desired durability and to ensure the integrity of the panel under applicable conditions. For example, the use of conventionally known adhesives, such as melamine, latexes, epoxies, silicones, cellulosics, rubber-solvent cements, and the like can be employed on the abutting surfaces by means of coating and application of pressure. Alternatively, the insulating layer can be applied to either the outer profiled layer or the inner sheathing layer, or between the two simultaneously, such that it completes its formation in place and thus self-adheres to either or both layers. For example, in the case of an insulating layer formed of reactive chemicals, such as a polyisocyanurate or polyurethane foam, the reactive chemicals (generally a polyisocyanate, an isocyanate-reactive compound such as a polyol, a catalyst and a blowing agent such as water, a halogenated methane, or the like can be mixed and rapidly applied between the profiled side layer and a back or release sheet. In one embodiment, the inner sheathing layer is used instead of a back or release sheet. The reaction results in foaming of the mixture, quickly followed by gellation and curing. Such formation-in-place of the insulation layer further reduces the manufacturing steps and, potentially, the cost of the final composition for the manufacturer and, ultimately, the builder.

The following examples are included to further illustrate the present invention. As such they are not, and are not intended to be, limitative of the scope of the invention in any way. All parts and percentages are by weight unless indicated otherwise.

EXAMPLE

Kraft linerboard sheets at 5-7 percent by weight moisture content are impregnated with uncatalyzed polymethylene diphenyldiisocyanate (PMDI) using one of two methods. The PMDI is available from The Dow Chemical Company as PAPI*-2027. In the first method, the PMDI is dissolved in acetone and the linerboard dipped in the resulting solution until saturated. The saturated sheets are then hung for a sufficient time to allow the solvent to evaporate. The other method used is roller coater impregnation. Here the linerboard is passed through a bead or puddle of undiluted liquid PMDI lying in the nip zone of two press rolls.

In the first method the amount impregnated is controlled by the concentration of the PMDI in the solution. In the second method pickup is controlled primarily by roll pressure and clearance. Kraft linerboard sheets of 58 lb basis weight (58 lb/1000 ft$^2$ or 283 g/m$^2$) are saturated with a 13 percent solution of PMDI in acetone. After evaporation of the solvent the sheets show a pickup of 12-14 percent PMDI. Identical linerboard sheets are also treated in a roll coater to achieve similar pickup. In one instance all of the coating is applied to the wire side of the sheet. A second sample is similarly coated on the felt side of the sheets. A third sample is made with the coating evenly distributed on both sides of the sheets.

In order to investigate distribution of the PMDI within the "Z", or thickness, dimension of the sheets, the impregnated sheets are cured by oven heating at 177° C. (350° F.) for 3-4 hours without external pressure. After cooling, the sheets are sectioned into the top, center and lower thirds of sheet thickness. These portions are analyzed for nitrogen content by the Kjeldahl method as a measure of the amount of PMDI in each layer. Results are shown in Table 1.

TABLE 1

| | Roller Coater Impregnation | | | |
|---|---|---|---|---|
| | Solvent | Wire Side | Felt Side | Both Sides |
| Felt side, percent nitrogen | 0.65 | 0.08 | 2.00 | 1.06 |
| Center, percent nitrogen | 0.78 | 0.92 | 0.90 | 0.58 |
| Wire side, percent nitrogen | 0.83 | 2.21 | 0.16 | 1.08 |

It is apparent under the conditions of the above tests that solvent impregnation produces the most uniform distribution of PMDI within the sheets. This is followed by two-sided roll coater application. There is a very marked one-sidedness to sheets coated on a single side.

A polyisocyanurate insulating layer is then prepared using the formulation in Table 2.

TABLE 2

| Component | Amount (parts per 100) parts by weight |
|---|---|
| Isocyananate[1] | 137 |
| Silicone Surfactants | 1.7 |
| Polyester Polyol A[2] | 31 |
| Polyester Polyol B[3] | 0 |
| Polyether Polyol[4] | 3 |
| Epoxy Resin[5] | 4 |
| Catalysts[6] | 4.48 |
| Diethylene Glycol | 1 |
| Water | 0.8 |
| 2-ethylhexanoic acid | 3 |

TABLE 2-continued

| Component | Amount (parts per 100) parts by weight |
|---|---|
| CFC-11 | 13 |

[1] The isocyanate is an 80/20 blend of 2,4'- and 2,6'-toluene diisocyanate.
[2] A polyester polyol based on dimethylterephthalate.
[3] A polyester polyol based on polyethylene terephthalate.
[4] A polyester polyol based on ethylene oxide.
[5] A liquid epoxy resin based on bisphenol A.
[6] Catalysts include urethanation and trimerization types.

All components except the isocyanate are blended together, then reacted simultaneously with the isocyanate by injecting the reaction mixture between the back of the profiled layer and an inner sheathing layer made of a plywood sheet. The mixture foams in place, gels and cures while adhering to both the back surface of the profiled siding layer and the inner sheathing layer, thus producing a "sandwich panel" ready for use in building construction as described hereinabove.

What is claimed is:

1. A structural siding composition for use in the building industry comprising
   (a) a siding layer prepared from an impregnated cellulosic material with an amount of essentially uncatalyzed polyisocyanate from about 8 to 20 percent by weight of polyisocyanate to cellulosic material, which has been heated at a temperature from about 105° to about 245° C. (221° to 473° F.) for a time not exceeding about 5 minutes and at a pressure from about 2700 to about 8300 kPa (390 to 1200 psi) sufficiently to cure the polyisocyanate, and
   (b) an insulating layer.

2. The composition of claim 1 wherein the cellulosic material is in a sheet form having first and second sheet surfaces substantially parallel to each other and a thickness dimension at substantially right angles to the surfaces.

3. The composition of claim 2 wherein the concentration of polyisocyanate by weight percent relative to the concentration of cellulose is essentially uniform throughout the thickness dimension of the sheet.

4. The composition of claim 2 wherein the concentration of polyisocyanate by weight percent relative to the concentration of cellulose is essentially non-uniform throughout the thickness dimension of the sheet.

5. The composition of claim 1 in which the cellulosic material is selected from the group consisting of chemically purified, kraft, and thermomechanical celluloses.

6. The composition of claim 1 in which the polyisocyanate is selected from the group consisting of diphenylmethane diisocyanate, oligomers of diphenylmethane diisocyanate, toluene diisocyanate, 1,6-hexamethylene diisocyanate, and mixtures thereof.

7. The composition of claim 1 in which the polyisocyanate is impregnated as a concentrate without dilution by a solvent into the cellulosic material.

8. The composition of claim 1 in which the polyisocyanate is impregnated as a solution into the cellulosic material.

9. The composition of claim 1 in which the cellulosic material has a moisture content not exceeding about 7 percent.

10. The composition of claim 1 wherein the insulating layer is a polyurethane, polyurea, polyisocyanurate or polystyrene foam.

11. The composition of claim 1 further comprising an inner sheathing layer proximate to the insulating layer and distal to the siding layer.

12. The composition of claim 11 wherein the inner sheathing layer is steel, wood, aluminum, a fiber-reinforced polymer, or the impregnated cellulosic material of claim 1.

13. The composition of claim 1 further comprising an adhesive between the siding layer and the insulating layer.

14. The composition of claim 11 further comprising an adhesive between the insulating layer and the inner sheathing layer.

15. The composition of claim 1 wherein the siding layer is a laminate of two or more impregnated sheets of cellulosic material.

16. The composition of claim 1 wherein the siding layer is profiled.

17. A method of preparing a structural siding composition for use in the building industry comprising
   (a) preparing a siding layer from an impregnated cellulosic material prepared using an amount of essentially uncatalyzed polyisocyanate of from about 8 to 20 percent by weight of polyisocyanate to cellulosic material, which has been heated at a temperature from about 105° to about 245° C. (221° to 473° F.) for a time not exceeding about 5 minutes and at a pressure from about 2700 to about 8300 kPa (390 to 1200 psi) sufficiently to cure the polyisocyanate, and
   (b) positioning an insulating layer proximate thereto.

18. The method of claim 17 further comprising profiling the siding layer.

19. The method of claim 17 wherein the insulating layer is prepared in situ from a reaction mixture.

20. The method of claim 17 further comprising (c) positioning an inner sheathing layer proximate to the insulating layer and distal to the siding layer.

21. The method of claim 17 further comprising positioning an adhesive between the siding layer and the insulating layer.

22. The method of claim 20 further comprising positioning an adhesive between the insulating layer and the inner sheathing layer.

* * * * *